Feb. 16, 1971  R. R. WALTON  3,563,623

ROTATIONAL ENERGY STORAGE AND DELIVERY DEVICES

Filed May 15, 1969  5 Sheets-Sheet 1

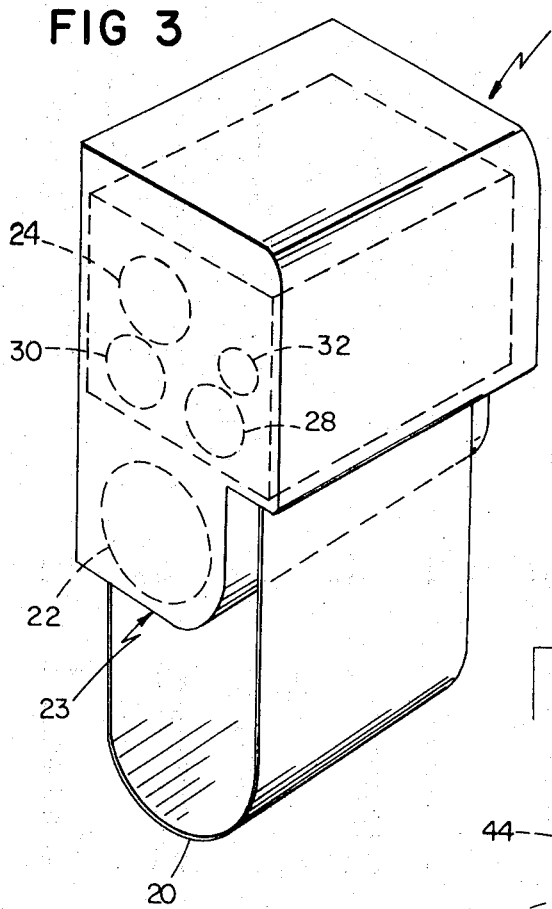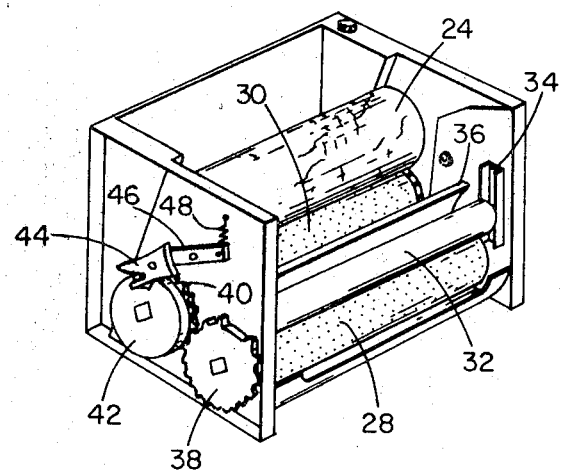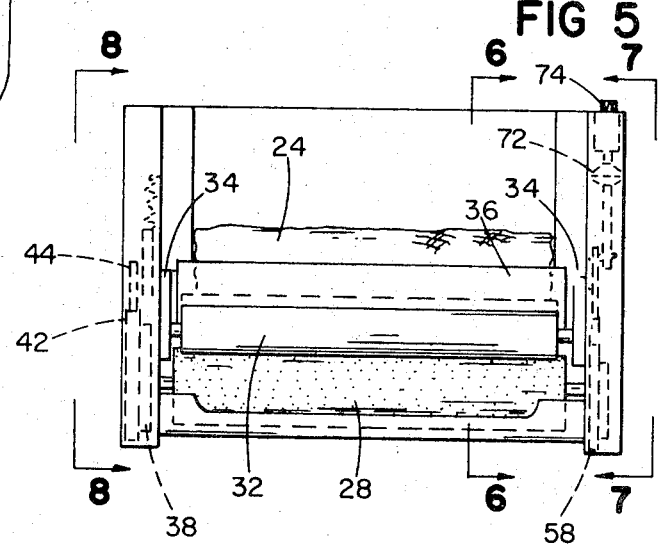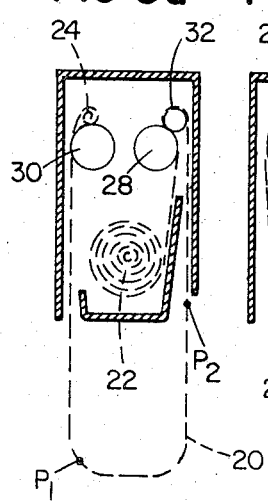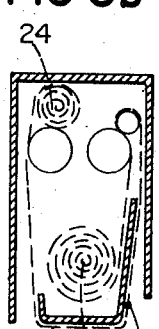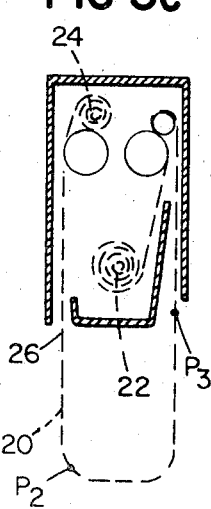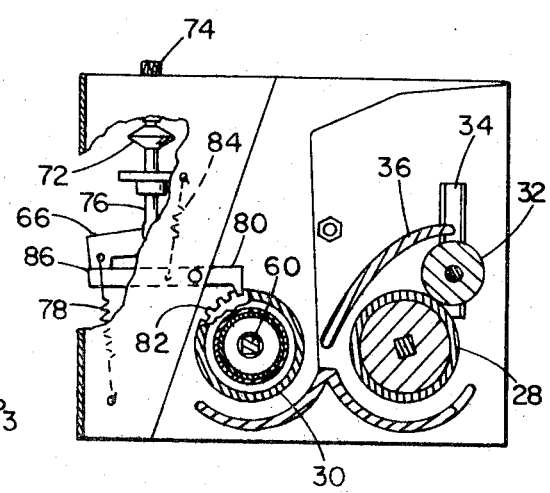

FIG 7
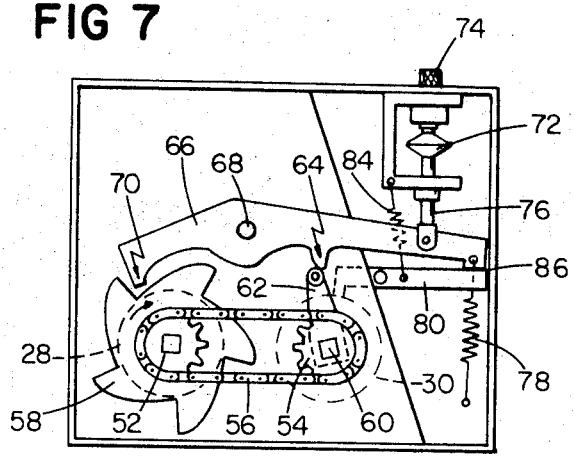
FIG 8
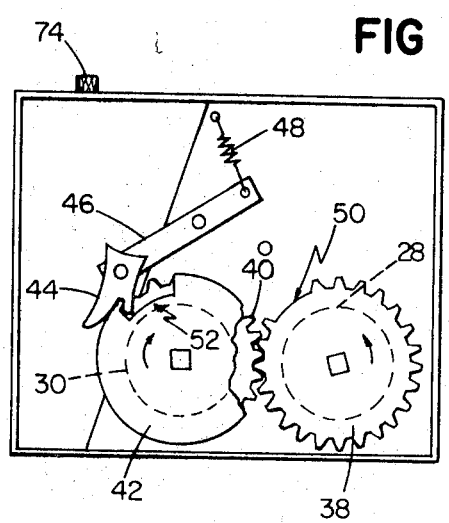
FIG 9a
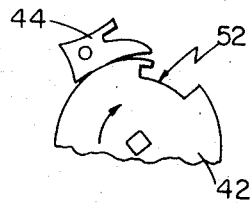
FIG 9b
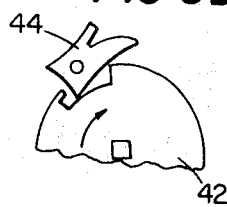
FIG 9c
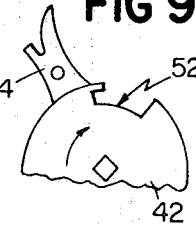
FIG 9d
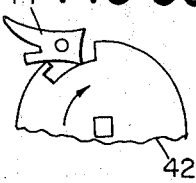
FIG 9e
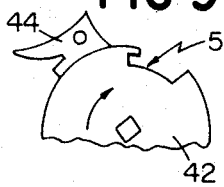
FIG 9f
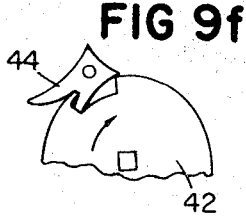
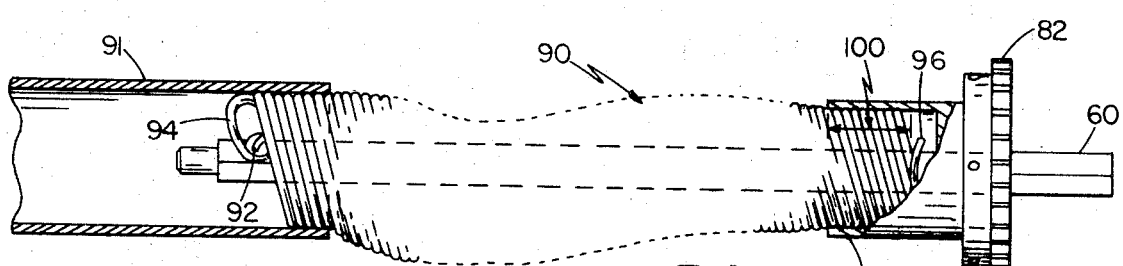
FIG 10
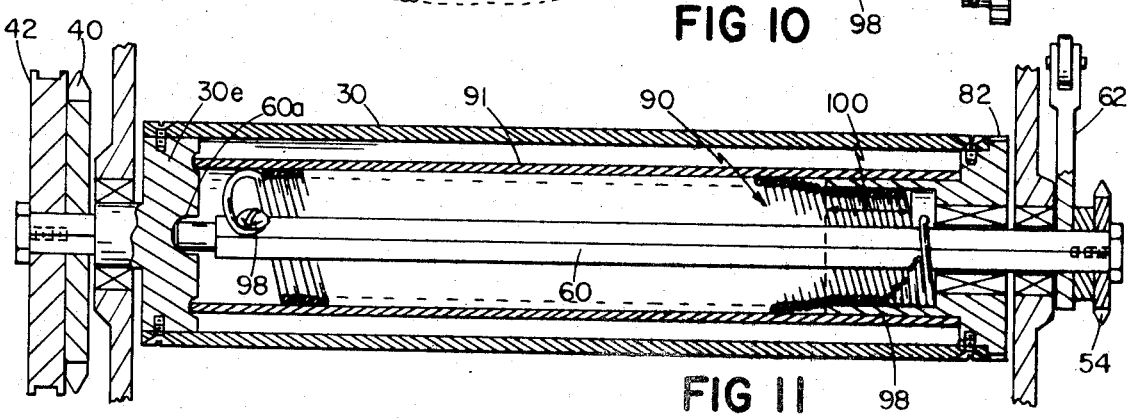
FIG 11

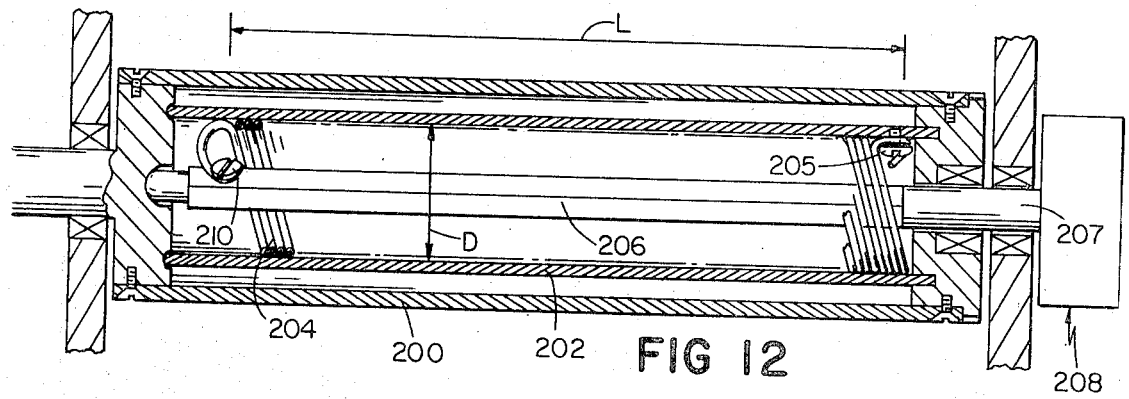
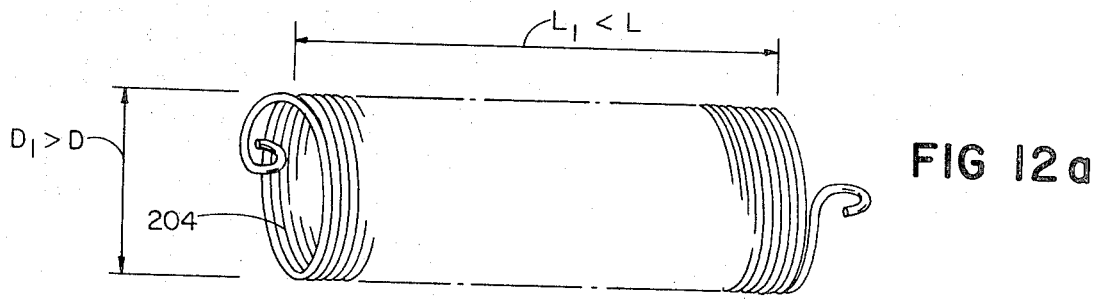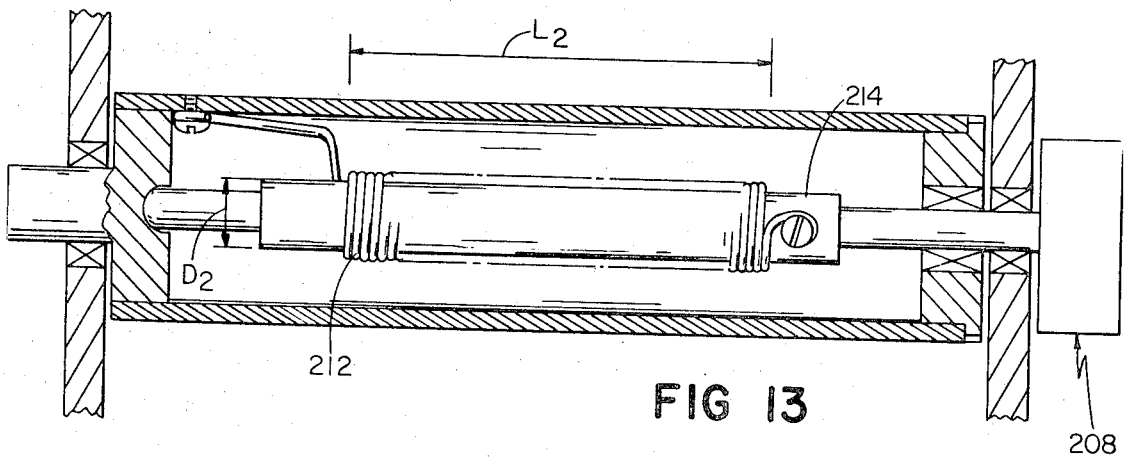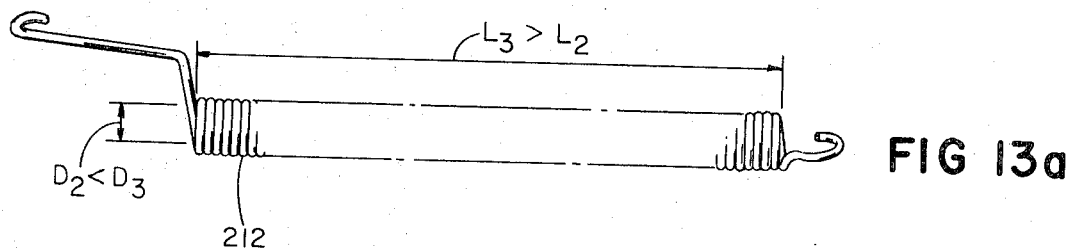

United States Patent Office 3,563,623
Patented Feb. 16, 1971

3,563,623
ROTATIONAL ENERGY STORAGE AND
DELIVERY DEVICES
Richard Rhodes Walton, 10 W. Hill Place,
Boston, Mass. 02114
Filed May 15, 1969, Ser. No. 824,799
Int. Cl. B65h 19/00
U.S. Cl. 312—38                    14 Claims

ABSTRACT OF THE DISCLOSURE

Towel dispensers using rotational energy storage and delivery devices, web drives using such devices, and such devices by themselves using helical springs which have upper and/or lower torque and stored-energy limits determined by the sizing of the spring and a co-operating surface. In towel dispensers a helical spring, receiving energy from the pull-down of the towel by the user, accomplishes take-up (between uses) of portions of an extended length of towel as well as take-up of the final tail of the towel without adding excessive resistance to pull of the towel by the user.

This invention relates to towel dispensers and other web drive systems using rotational energy storage devices. It also relates to improvements in rotational energy storage devices themselves.

An object of the invention is to provide a compact, efficient, inexpensive, and convenient towel or web dispensing unit capable of retracting all portions of the towel or web which have been used or are presently unwanted.

Other objects are to provide rotational energy storage devices which are operable within predetermined torque and energy limits.

The invention features an elongated hollow roll mounted for rotation, and end member extending into the roll and mounted to permit relative rotation of the roll, and an elongated helical spring disposed within and generally parallel with the roll. A first portion of the spring is operatively connected to the roll, and a second portion of the spring spaced from the first portion is operatively connected to the end member. The spring is rotationally prestressed by means of a restraining surfaces that prevents the spring from returning to its unstressed diameter. A mechanism is provided to restarin the end member during rotation of the roll (whereby energy is stored by further rotational stressing of the spring and attendant change of its diameter) and to apply this energy for later movement of the web.

In preferred embodiments there is featured a friction clutch in the form of a further restraining surface which serves to operatively connect a portion of the spring to either the roll or the end member.

The invention also features an improved towel dispenser comprising a holder for an extended length of fresh towel in combination with a mechanism for controlling the dispensing and retraction of the towel that includes the aforementioned web drive adapted so that movement of the towel causes storage of potential energy, and means to apply this energy to cause retraction of at least one portion of the towel automatically without effort of the operator.

Also featured is such a towel dispenser adapted for cyclic operation in which an operator first withdraws a length of fresh towel for use, the dispenser including a retraction assembly which automatically retracts the length of towel before the next use of the dispenser. The dispenser defines a web path causing the fresh towel to engage a driven member when withdrawn by the operator, the driven member being connected to cause a predetermined amount of rotative distortion of the spring. The spring and retraction assembly are so related that retraction of the towel to complete a cycle requires release of less rotational distortion of the spring than the distortion applied during the withdrawal portion of the cycle, which results in a net increase of distortion and storage of energy with each cycle. The dispenser is constructed to employ this excess energy to entirely retract the tail end of the towel when it is reached.

Further features include such a towel dispenser wherein one portion of the spring is operatively connected to its respective member by a friction clutch in the form of a second restraining surface frictionally engaging a portion of the spring. The second restraining surface has a diameter adapted to prestress its portion of the spring a greater amount than the prestress of the part of the spring engaged by the first mentioned restraining surface. The second restraining surface is adapted to slip relative to the spring when the diameter of its portion of spring changes due to storage of a pre-determined amount of energy; the second restraining surface being sized to slip upon the spring upon storage of sufficient energy to retract the tail end of the towel.

The invention also features a rotational energy storage-delivery device, per se, operable to store and deliver energy within a predetermined torque and energy range. It comprises a pair of restraining surfaces adapted to restrain portions of a helical spring system under different degrees of prestress. The spring is thus prevented from reaching a lower energy storage level, and it stores energy between that level and a higher level, at which time it slips upon the second restraining surface and cannot store more energy. Such a device, or variations thereupon, while useful in towel cabinets as shown in the preferred embodiment, are seen as also useful in other areas where energy storage is required, (e.g. in toys) where torque or energy storage limits are desired either to protect the device or the user or to make available a predetermined amount of energy or energy within predetermined torque limits.

Other objects, features, and advantages will appear from the following description of preferred embodiments of the invention, taken together with the attached drawings thereof, in which:

FIG. 3 is a perspective view of another towel dispenser according to the invention;

FIGS. 3a, 3b and 3c are diagrammatic illustrations of steps in the functioning of the dispenser of FIG. 3;

FIG. 4 is a perspective view of the operating device of the dispenser of FIG. 3;

FIG. 5 is a front view of the device of FIG. 4;

FIG. 6 is a view taken at 6—6 of FIG. 5;

FIG. 7 is a view taken at 7—7 of FIG. 5;

FIG. 8 is a view taken at 8—8 of FIG. 5;

FIGS. 9a, 9b, 9c, 9d, 9e and 9f illustrate steps in the operation of an element of the device of FIG. 4;

FIG. 10 is a view during assembly of the spring and roller assembly according to the invention;

FIG. 11 is a longitudinal section of the assembly of FIG. 10 in position in the device of FIG. 4;

FIG. 12 is a longitudinal cross section of a web drive system according to the invention;

FIG. 12a is an illustration of the coil spring of the web drive system of FIG. 12 in an unstressed state;

FIG. 13 is a longitudinal cross section of an alternative embodiment of a web drive system according to the invention;

FIG. 13a is an illustration of the coil spring of the web drive system of FIG. 13 in an unstressed state.

Figure 1:
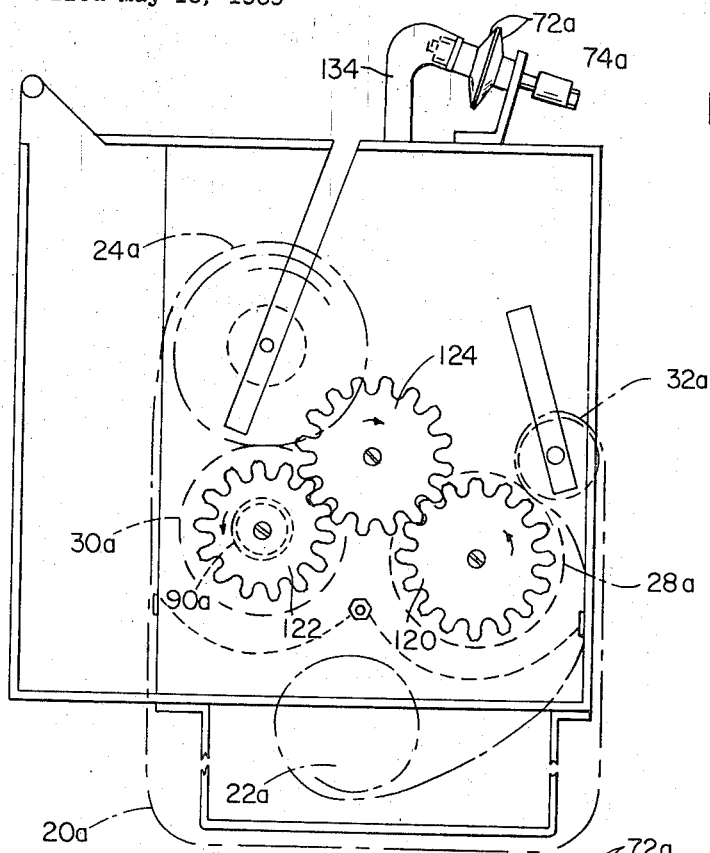
FIG. 1 is a view similar to FIG. 8 of an embodiment of a towel dispenser according to the invention.

Reference will first be made to the embodiment of FIGS. 3-11.

FIG. 3 shows a towel dispenser, indicated generally by 19, with a loop of towel 20 in position for use. The supply roll 22 of clean towel is located in holder 23. The take-up roll of used towel is denoted by 24.

The preferred mode of operation of the dispenser is illustrated by FIGS. 3a, 3b and 3c. The point P2 on the towel web 20 indicates the farthest point along the towel that can be used by the current user. P1 indicates the farthest point of use by the previous user. Thus the region between P2 and P1 is available for the current user. Between uses the towel loop is retracted by means which cause the take-up roll 24 to take up the loop, drawing point P2 around to the location indicated in FIG. 3b. Thus the subsequent user will touch only clean towel as he grasps the web and pulls down. The dispenser, under the influence of this pull on the web, allows predetermined lengths of both used and fresh towel to be pulled down. The resulting loop, shown in FIG. 3c, offers the user clean towel between P3 and P2 without wasting clean towel between P2 and point 26, a region unlikely to be touched by the user.

FIG. 4 is a perspective view of the operational portion of the dispenser. Roll 28 is termed the drive roll and roll 30 the wind-up roll. The rolls have an abrasive surface in order to positively engage the towel from the clean towel supply roll 22 and the take-up roll of dirty towel 24, respectively, as illustrated in FIGS. 3a, 3b and 3c. Pinch roll 32, set in guides 34, assures a positive rotation of roll 28 when the user pulls down fresh towel. Guard member 36 is provided to prevent contact of clean and dirty portions of the towel web. Gears 38 and 40, cam plate 42, dog 44, arm 46, and spring 48 are shown in more detail in FIG. 8.

Gear 38 is rigidly attached to roll 28 and gear 40 and cam plate 42 are rigidly attached to roll 30. The arrows in FIG. 8 indicate the rotations which occur when a user pulls down on the towel web 20 beginning when the loop has been retracted, as in FIG. 3b. At the beginning of a cycle the area of missing teeth 50 registers with gear 42. As soon as gear 38 starts to turn its teeth engage gear 42. Thus to begin a cycle the clean towel is pulled, it rotates roll 28, and emerges from the dispenser to form the front of the loop in FIG. 3c. Roll 30 feeds down used towel to form the back of the loop. The ratio of clean to used towel may be varied by varying the number of teeth on gear 38 relative to the teeth on gear 40. As soon as the proper size loop of towel is formed gear 38 has completed one revolution and the missing teeth area 50 again registers with gear 42 (to allow roll 30 to rotate for retro action when the timer releases, described later).

Normally for drying the hands with this embodiment one pull of the towel provides sufficient towel, and upon release of the timer retract action occurs. However, in some instances the user desires a larger loop of towel. This is achieved by allowing the user to override the retract action for three consecutive times. Thereafter the dispenser locks and retract action will occur when the user releases the towel. This feature permitting three pulls is achieved by the operation of dog 44 and cam plate 42 illustrated in FIGS. 9a through 9f. The dog 44 rides the edge of cam plate 42 under the influence of arm 46 and spring 48. Cam plate 42 is notched as at 52. If the initial position of dog 44 is as shown in FIG. 9a, it is apparent that three rotations of cam plate 42 occur before dog 44 engages notch 52 to prevent further rotation. This rotation sequence is illustrated in FIGS. 9a through 9f. The reverse rotation of roll 30 in the loop take-up operation returns dog 44 to its initial configuration as in FIG. 9a.

FIG. 7 illustrates the ends of the rolls 28 and 30 opposite from the ends in FIG. 8. Here sprockets 52 and 54 are engaged with chain 56. Sprocket 52 and five-toothed sprocket 58 are rigidly attached to roll 28. Sprocket 54, however, is rigidly attached to shaft 60 which rotates independently of roll 30, as illustrated in FIG. 11. The roll 30 and shaft 60 are caused to rotate in opposite senses when roll 28 rotates under the influence of a pull on the towel web by the user. As will be described below, this counter-rotation causes the storage of energy in a helical wind-up spring attached to shaft 60 within roll 30. (The left hand end of shaft 60 in FIG. 11 lies in a bearing 60a formed by the endplate 30e of roll 30.)

Cam arm 62 is also rigidly attached to shaft 60. Once per rotation cam arm 62 strikes cam surface 64 and thereby causes rocker arm 66 to rotate about pivot 68. This rotation causes tip 70 of rocker arm 66 to engage a tooth of five-toothed sprocket 58 and thereby prevent further rotation. Rocker arm 66 is then held in this position for a fixed interval by a timer comprising suction cups 72 and needle valve 74. Suction cups 72 engage each other when rocker arm 66 is rotated by cam arm 62 causing plunger 76 to rise. When the suction cups release spring 78 returns rocker arm 66 to its original position.

At the same time that tip 70 of rocker 66 engages five-toothed sprocket 58 and thereby prevents rotation of roll 28, arm 80 is engaged with teeth 82 on roll 30 (best seen in FIG. 6) under the influence of spring 84. Rocker arm 66 and arm 80 are in sliding contact at point 86. Arm 80, when engaged with teeth 82, prevents counter-clockwise rotation (in FIG. 6) and permits clockwise rotation (in FIG. 6).

From the foregoing description it is apparent that the user may pull down a length of clean towel equal to the circumference of roll 28 before the roll is locked. After release of the suction cups 72 a second such length may be pulled down. And similarly a third length. After three such pulls, however, dog 44 engages notch 52 (see FIG. 8) to prevent access to more clean towel.

FIG. 10 illustrates the construction of the energy storing assembly. Helical wind up spring 90 has an unstressed diameter larger than hollow cylinder 91, and is rotationally prestressed to reduce its diameter to fit within the hollow cylinder. The spring 90 is attached to shaft 60 by means of screw 92 at one end, 94, of the spring. The other end, 96, of the spring is free to rotate within cup 98. The internal diameter of cup 98, however, is less than that of cylinder 91 and this diameter is so chosen that the cup acts as a restraining surface, engaging prestressed helical spring 90 in the region 100 and thus acting as a friction clutch.

The sequential operation of the towel dispenser may now be described with reference to FIG. 11. As the fresh towel is pulled down by the user, gear 40 rotates roll 30 to let down used towel as well. The ratio of used fresh towel is determined by the relative number of teeth on gears 38 and 40. Simultaneously, helical spring 90 is stressed by the rotation of shaft 60 in a sense opposite to the rotation of roll 30. When the timer releases the rolls 28 and 30 (after one, two or three rotations as described above), roll 30 rotates, winding up the used towel loop onto used towel roll 24 (see FIGS. 3a, 3b and 3c) under the force of helical spring 90 exerted on cup 98 in the region 100. The missing teeth from gear 38 prevent the rotation of roller 28 at this time so that all of the used towel is retracted onto used towel roll 24.

By providing a greater number of teeth on sprocket 52 than on sprocket 54 more energy can be stored in the helical spring in each cycle than is required to retract the towel pulled down during that cycle. This stored energy builds up with each use and is available to retract the trailing segment of the towel when the roll of fresh towel 22 has been depleted.

Helical spring 90 is preferably of constant unstressed diameter and is prestressed to a degree sufficient to insure a positive retraction of used towel from the very first use overcoming internal friction of the various components of the mechanism. Also, the spring 90 and the diameter of cup 98 are so chosen that spring 90 will slide within cup 98 after sufficient energy has been stored to retract the trailing segment of the towel, thus to avoid unnecessary increase in the loading of the spring. For instance the spring may be formed of wire of .062 in. diameter, the unstressed outer diameter of the helix being 1.255 in. It is rotationally prestressed to fit within cylinder 91 of 1.225 in. diameter and cup 98 of 1.085 in. diameter.

Figure 2:
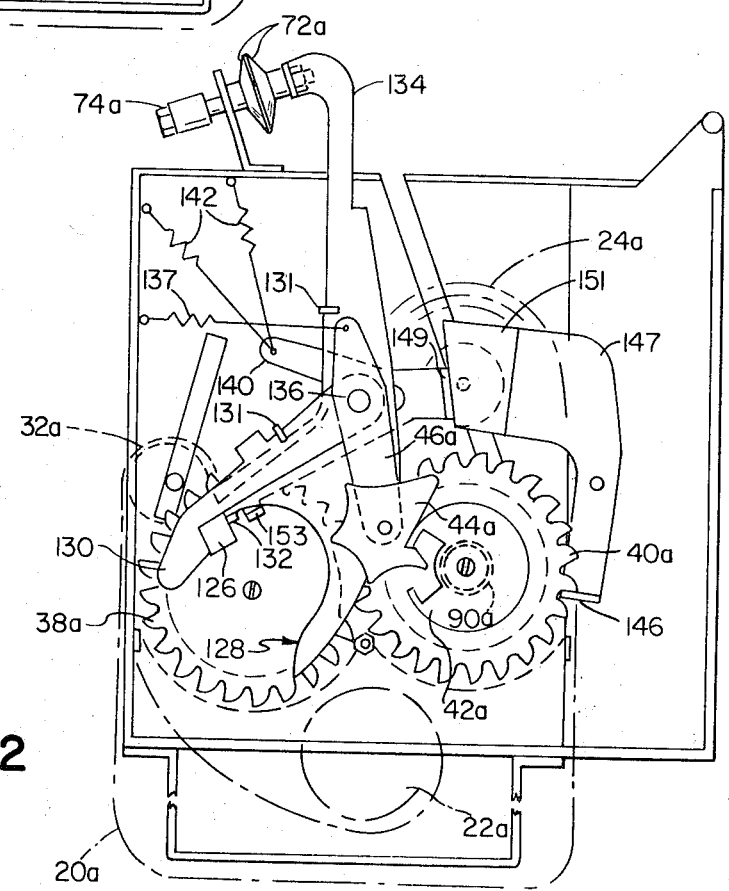
FIG. 2 is a view similar to FIG. 7 of the embodiment of FIG. 1.

FIGS. 1 and 2 are end views, analogous to FIGS. 8 and 7, of an alternative embodiment of a towel dispenser according to the invention. In this embodiment gears 120 and 122 are rigidly attached to roll 28a and to the shaft within roll 30a, respectively, and are engaged by means of idler 124. The arrows in FIG. 12 indicate the directions of rotation as the user pulls down a length of towel. Pinch roll 32a and take up roll 24a function as described above; as does timer which comprises suction cups 72a and needle valve 74a.

Dog 44a and cam plate 42a of FIG. 2 limit the user to a maximum of four lengths of towel in a manner analogous to that described above. As roll 28a rotates under the influence of the user's pull on the towel, cam element 126, affixed to gear 38a on roll 28a, slides on cam surface 128, integral with rocker arm 134, and thereby forces suction cups 72a together. Later in the rotation cam element 126 forces anti-backup arm 130 to rise against the influence of spring 131. (Spring 131 is wound around pivot 136 and its opposite ends bear upon antibackup arm 130 and rocker arm 134). When cam element 126 reaches the position shown in FIG. 2 antibackup arm 130 drops to the position there shown and thereby prevents reverse rotation of roll 28a. In this position cam element 126, and thus roll 28a is prevented from further forward rotation by tip 132 of rocker arm 134. When the suction cups 72a release, rocker arm 134 pivots about pivot shaft 136 under the influence of spring 131 thereby moving the tip 132 from the path of cam element 126. When this occurs the user is free to pull down another length of towel, as above. If the user has released the towel, retraction occurs at this point, as described above.

Figure 2A:
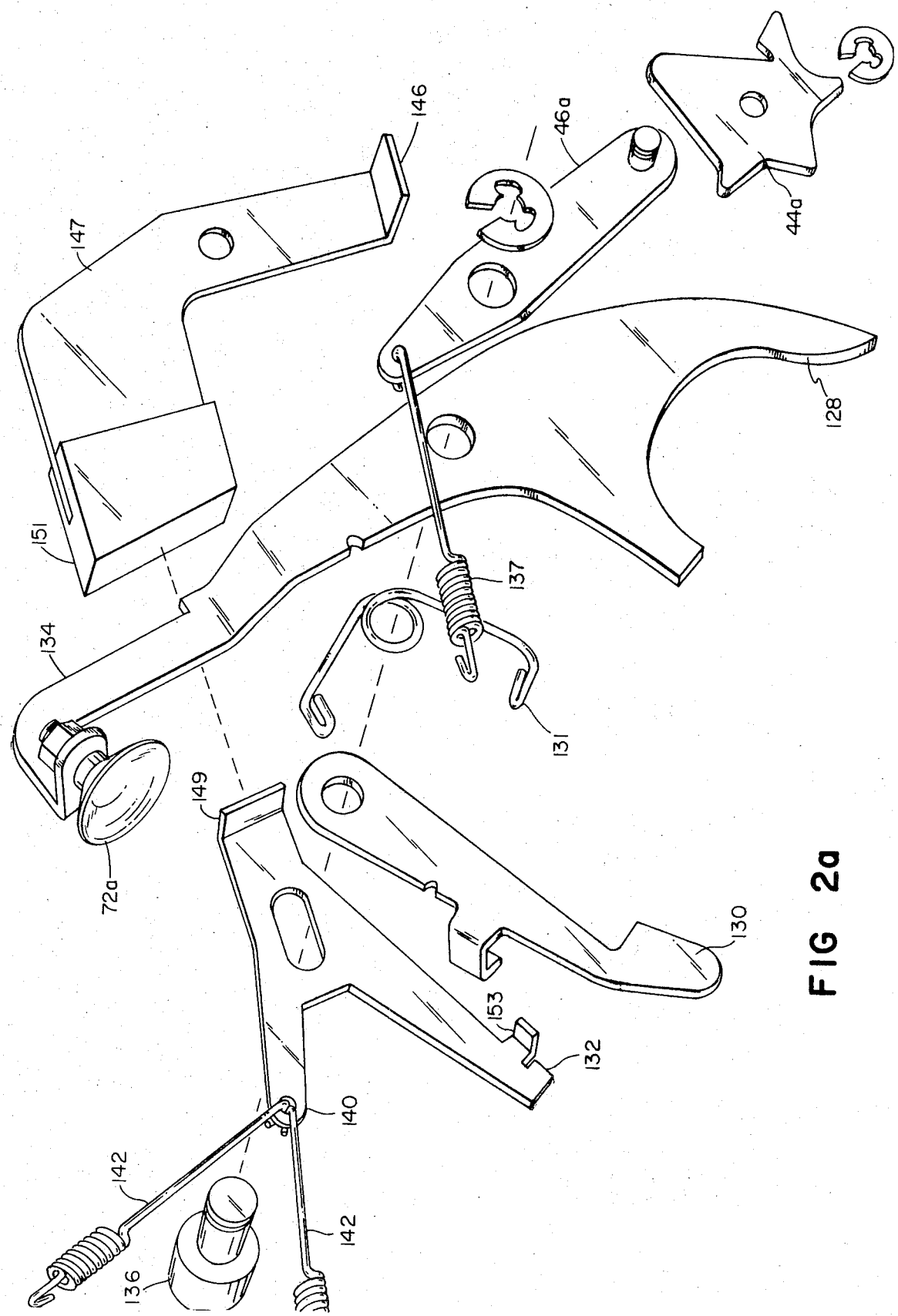

Anti-backup rachet 140 is also pivoted about 136. Under the influence of springs 142, tip 146 of arm 147 is engaged with teeth 40a on roll 30a preventing rotation, as tip 149 of rachet 140 bears against and overcomes counterweight 151 of arm 147. When suction cups 72a release and rocker arm 134 rotates about pivot shaft 136, tip 153 of rachet 140 is no longer restrained by rockerarm 134 and thus springs 142 rotate rachet 140 counterclockwise thereby allowing arm 147 to rotate, under the influence of counterweight 151, away from teeth 40a. (The interrelation of the elements discussed above may become clearer with reference to the exploded view of FIG. 2a.)

In this embodiment the helical spring 90a is again mounted within roll 30a on a shaft and restrained by a friction clutch cup as in FIG. 10. As the user pulls down on the towel 20a, the rotation of roll 28a produces rotations of opposite senses in roll 30a and the shaft to which spring 90a is affixed, thus storing energy in the spring. After one complete rotation of roll 28a cam element 126 is locked as shown in FIG. 2 and thereby prevents rotation of 28a in either direction. When the timer releases, roll 30a is released as anti-backup ratchet 140 is rotated away from the teeth of roll 30a in the manner mentioned above. Rachet 140 has an aperture of elongated shape. The attitude of this rachet is maintained by the lip 153 and the upper lip of the anti-backup arm 130. As the cam actuator 126 completes its full revolution and strikes the end of the rachet at 132 it drives this piece forward the length of the aperture. This causes arm 147 to rotate about its pivot and engage tip 146 in the teeth of gear 40a thus holding the stored energy until the vacuum cups release. The release raises tip 132 of ratchet 140 above the cam actuator 126 and allows the rachet to move back the length of the aperture.

When roll 30a is freed, the stored energy in spring 90a is transmitted to the roll by means of the above-mentioned friction clutch cup. The shaft to which spring 90a is affixed cannot rotate in the opposite sense of roll 30a, and thereby waste a portion of the stored energy, since the shaft is locked to the roll 28a by means of the gears shown in FIG. 1 and since roll 28a itself is locked by anti-backup arm 130. The missing teeth on gear 38a permit the rotation of roll 30a even though roll 28a is locked.

It is important to note that the drive device employed in these dispensers can be viewed as a rotational energy storage-delivery device operable to store and deliver rotational energy within a predetermined torque range. The lower limit of the torque range is defined by the amount of prestress of the spring which is permanently retained by the action of the restraining surface, e.g. 91 of FIG. 11. The upper limit of the torque range is defined by the sizing of the slip clutch cup, e.g. 98 of FIG. 11, which insures slippage after a predetermined amount of energy (and attendant torque build-up) has occured. In the unique construction of the towel cabinet, the lower torque limit assures that even the first pull on the towel will cause an additional spring deformation sufficient to provide enough energy to overcome the internal friction of the dispenser and retract the towel. The upper limit assures, after storage of enough energy to take up the tail at the end of the towel supply roll, that the torque will not build up further and make the dispenser too hard to operate (since the user must overcome the built-up torque when he pulls down a length of towel). In the presently most preferred embodiment this mechanism is confined within one of the dispenser rolls, resulting in a very compact structure. It will be obvious, however, that at the cost of loss of some compactness, the mechanism could be located outside of the dispenser roll, as long as it still was included in the dispenser drive train.

Another aspect of the invention is this unique drive per se, for it will be understood that this drive (rotational energy storage and delivery device) can be employed for other areas: e.g., in window shade wind-up devices, as well as in toys and other devices where the ability to prespecify a torque range will be of benefit in protecting the device from damage in making it easier to operate, or in making it more compatible with other mechanical components or uses.

Referring now to somewhat diagrammatic FIG. 12, hollow roll 200 encloses spring restraining cylinder 202, helical spring 204, and shaft 206. Shaft 206 is mounted to be independently rotatable with respect to roll 200 and protrudes from one end of roll 200 as at 207. Shaft 206 may thus be called an "end member." Unit 208 is any device capable of preventing rotation of shaft 206 when roll 200 is rotated. Roll 200 and shaft 206 are interconnected by means of helical spring 204, the ends of which are rigidly attached to said roller and said shaft by screws 205 and 210 respectively.

Helical spring 204 has a large number of helical turns with the helix angle of each turn lying in substantially the same direction and is prestressed before being attached to roll 200 and to shaft 206. In this prestressed condition the spring has diameter D and Length L, as in FIG. 12. The unstressed helical spring 204 is shown in FIG. 12a and has diameter $D_1$ and length $L_1$, where $D_1 > D$ and $L_1 < L$. The prestressing of helical spring 204 insures that sufficient force will be available to overcome friction in the bearings of the roll 200 even when the spring is rotationally distorted only a small amount by movement of the web.

In a typical system, roll 200 will have a web wound around it. During one segment of a typical operation the web, or a portion thereof, may be unrolled while shaft 206 is locked by unit 208. The relative rotation of roll 200 and shaft 206 stresses helical spring 204, thereby storing potential energy in the spring. Release of the web at a subsequent time causes the counterrotation of roll 200 under the influence of helical spring 204, and thus the web is retracted back onto roll 200.

An alternative embodiment of prestressed helical spring and restraining surface is illustrated in FIG. 13. Here the prestressed spring 212 has a diameter $D_2$ greater than the unstressed diameter $D_3$ (shown in FIG. 13a) and a length $L_2$ less than the unstressed length $L_3$ (shown in FIG. 13a). Mandrel 214 serves as a restraining surface.

What is claimed is:

1. In a web drive comprising at least one roll, an energy storing device in which movement of the web causes storage of potential energy, and mechanism adapted to apply said energy to cause a second movement of the web, the improvement where said roll is hollow and mounted for rotation, an end member extends into the roll and is mounted to permit relative rotation of said roll, and an elongated helical spring is disposed within and generally parallel with said roll, a first portion of said spring operatively connected to said roll and a second portion of said spring spaced from said first portion operatively connected to said end member, a length of said spring being rotationally prestressed to have a diameter different from its unstressed diameter, a restraining surface engaging the spring and preventing the spring from returning to its unstressed diameter, and mechanism to restrain said end member during rotation of said roll whereby energy is stored by further rotational stressing of said spring and attendant change of its diameter.

2. The web drive device of claim 1 wherein said diameter of said prestressed spring is smaller than said unstressed diameter and said restraining surface comprises the inside surface of a hollow cylinder, said cylinder enclosing said prestressed spring.

3. The web drive device of claim 1 wherein said diameter of said prestressed spring is larger than said unstressed diameter and said restraining surface comprises the urface of a mandrel about which said spring is disposed.

4. The web drive device of claim 1 wherein said one portion of the spring is operatively connected to its respective member by a friction clutch in the form of a second restraining surface frictionally engaging said portion of said spring, said second restraining surface having a diameter adapted to prestress said portion of the spring a greater amount than the prestress of the part of the spring engaged by the first mentioned restraining surface, said second restraining surface adapted to slip relative to the spring when the diameter of the portion of spring with which it is engaged changes due to storage of a predetermined amount of energy.

5. The web drive device of claim 4 wherein said spring has a uniform unstressed diameter throughout its length, said first restraining surface comprises a first hollow cylinder surrounding a length of said spring, said cylinder having an internal diameter less than the diameter of said unstressed spring, and said second restraining surface comprises a second hollow cylinder of lesser internal diameter than said first hollow cylinder.

6. In a towel dispenser comprising a holder for an extended length of fresh towel and a web drive for controlling the dispensing and retraction of the towel, the web drive including an energy storing device in which movement of the towel causes storage of potential energy, and mechanism adapted to apply said energy to cause retraction of at least one portion of the towel automatically without effort of the operator, the improvement wherein said energy storing device comprises an elongated hollow roll mounted for rotation, an end member extending into the roll and mounted to permit relative rotation of said roll, and an elongated helical spring disposed within and generally parallel with said roll, a first portion of said spring operatively connected to said roll and a second portion spaced from said first portion operatively connected to said end member, a length of said spring being rotationally prestressed to have a diameter different from its unstressed diameter, a restraining surface engaging the spring and preventing the spring from returning to its unstressed diameter, and mechanism to restrain said end member during rotation of said roll whereby energy is stored by further rotational stressing of said spring and attendant change of its diameter.

7. The towel dispenser of claim 6 adapted for cyclic operation in which an operator first withdraws a length of fresh towel for use, said dispenser including a retraction mechanism which automatically retracts the length of towel before the next use of the dispenser, said dispenser defining a web path to cause the fresh towel to engage a driven member when withdrawn by the operator, said driven member connected to cause a predetermined amount of rotational distortion of said spring, said dispenser constructed to cause said spring to drive said retraction mechanism, said spring and retraction mechanism so related that retraction of said towel to complete a cycle requires release of rotational distortion of the spring in an amount less than the distortion applied during the withdrawal portion of the cycle, resulting in a net increase of distortion and storage of energy with each cycle, said dispenser constructed to employ the excess energy to entirely retract the tail end of the towel when it is reached.

8. The towel dispenser of claim 7 wherein one portion of the spring is operatively connected to its respective member by a friction clutch in the form of a second restraining surface frictionally engaging said portion of said spring, said second restraining surface having a diameter adapted to prestress said portion of the spring a greater amount than the prestress of the part of the spring engaged by the first mentioned restraining surface, said second restraining surface adapted to slip relative to the spring when the diameter of said portion of spring changes due to storage of a predetermined amount of energy, said second restraining surface sized to slip upon said portion of said spring upon the storage of sufficient energy to retract said tail end.

9. The towel dispenser of claim 7 wherein said driven member engaged by said fresh towel is connected to cause the back feeding of a length of used towel in a predetermined ratio to the length of fresh towel which said operator withdraws, said connection comprising interacting gears, a first gear being rigidly attached to said driven member and a second gear being rigidly attached to a second driven member disposed along the web path so as to engage a used towel segment of the towel web, and said spring connected to receive rotational stress proportional to the sum of the lengths of the fresh towel and used towel withdrawn by the operator.

10. In a towel dispenser comprising a holder for an extended length of fresh towel and a web drive for controlling the dispensing and retraction of the towel, the web drive including an energy storing device in which movement of the towel causes storage of potential energy, and mechanism adapted to apply said energy to cause retraction of at least one portion of the towel automatically without effort of the operator, the improvement wherein said energy storing device comprises an elongated hollow roll mounted for rotation, an end member extending into the roll and mounted to permit relative rotation of said roll, and an elongated helical spring disposed within and generally parallel with said roll, a first portion of said spring operatively connected to said roll and a second portion spaced from said first portion operatively connected to said end member, said spring being free from constraint against change in size attendant with increase in stored energy, one of said operative connections with said spring comprising a restraining surface engaging a portion only of said spring and preventing said portion of spring from returning to its unstressed diameter, and mechanism to restrain said end member during rotation of said roll whereby energy is stored by rotational stressing of said spring and attendant change of its diameter, said operative connection which comprises said restraining surface providing a slip clutch which slips upon storage of a predetermined energy in the portion of the spring not engaged by said restraining surface.

11. In a towel dispenser comprising a holder for an extended length of fresh towel and a web drive for controlling the dispensing and retraction of the towel, the web drive including an energy storing device in which movement of the towel causes storage of potential energy, and mechanism adapted to apply said energy to cause retraction of at least one portion of the towel automatically without effort of the operator, the improvement wherein said energy storage device is operable to store and deliver rotational energy within a predetermined torque range said energy storage device comprising a first rotatable member, an elongated helical spring concentric with and having a first portion connected to said first rotatable member, said helical spring having a large number of helical turns and adapted to store and deliver energy by elastic rotational deformation which alters the diameter of said turns, said spring having a given diameter in the unstressed condition, a friction clutch surface concentric with and disposed to engage a second portion of said helical spring, spaced from said first portion, said clutch surface connected to a second rotatable member, one of said first and second rotatable members operatively connected to be driven by towel as it is withdrawn from the cabinet, and the other rotatable member operatively connected to drive a towel wind-up device, said wind-up device responsive to a timer for winding up the withdrawn towel, a restraining surface, a length of said spring extending between said first and second spring portions concentric with and disposed to engage said restraining surface, said spring rotationally prestressed to a first stressed diameter, and said restraining surface sized to restrain said spring from relaxing beyond said first stressed diameter, the portion of said spring corresponding to said friction clutch surface prestressed a predetermined amount greater than said length to a second stressed diameter, said friction clutch surface sized to prevent said second portion from relaxing beyond said stressed diameter, said restraining surface and the corresponding length of prestressed spring imposing a lower torque limit sufficiently high so that withdrawal of any towel portion stores sufficient energy to enable later wind-up of said towel portion, and said slip clutch surface and the corresponding portion of prestressed spring imposing an upper torque limit preventing the spring from imposing continually increasing drag upon the towel.

12. A rotational energy storage-delivery device operable to store and deliver rotational energy within a predetermined torque range comprising a first rotatable member, an elongated helical spring concentric with and having a first portion connected to said first rotatable member, said helical spring having a large number of helical turns and adapted to store and deliver energy by elastic rotational deformation which alters the diameter of said turns, said spring having a given diameter in the unstressed condition, a friction clutch surface concentric with and disposd to engage a second portion of said helical spring, spaced from said first portion, said clutch surface connected to a second rotatable member, a restraining surface, a length of said spring extending between said first and second spring portions concentric with and disposed to engage said restraining surface, said spring rotationally prestressed to a first stressed diameter, and said restraining surface sized to restrain said spring from relaxing beyond said first stressed diameter, the portion of said spring corresponding to said friction clutch surface prestressed a predetermined amount greater than said length to a second stressed diameter, said friction clutch surface sized to prevent said second portion from relaxing beyond said stressed diameter, whereby said spring, because of the restraints imposed thereupon, is capable of receiving and delivering energy between said first and second rotatable members only at torques above a first limit imposed by said restraining surface and only at torques below a second limit beyond which said spring slips relative to said friction clutch surface.

13. In a towel dispenser a retraction device comprising a helical spring connected to receive and store energy during pull-down of a portion of towel, and a timer adapted to activate said spring to retract the towel thus pulled down, said dispenser including a first roll driven by pull-down of towel and a second roll arranged to take-up and pay-out used towel, a gear engaging said first roll with said second to pay-out used towel upon pull-down of fresh towel and tensioning of said spring, at least one of said gears having a section of missing teeth whereby when registered with said other roll said second roll is free to turn under the influence of said spring to take-up the towel.

14. The combination of claim 13 including a rotatable dog assembly limiting said rolls to a predetermined plurality of pull-down rotations before locking to prevent further towel pull-down.

References Cited
UNITED STATES PATENTS

| | | | |
|---|---|---|---|
| 3,323,848 | 6/1967 | Bahnsen | 312—38 |
| 3,408,125 | 10/1968 | Rasmussen | 312—39 |

PATRICK D. LAWSON, Primary Examiner